3,049,486
NUCLEAR REACTOR FUEL-BREEDER FUEL ELEMENT

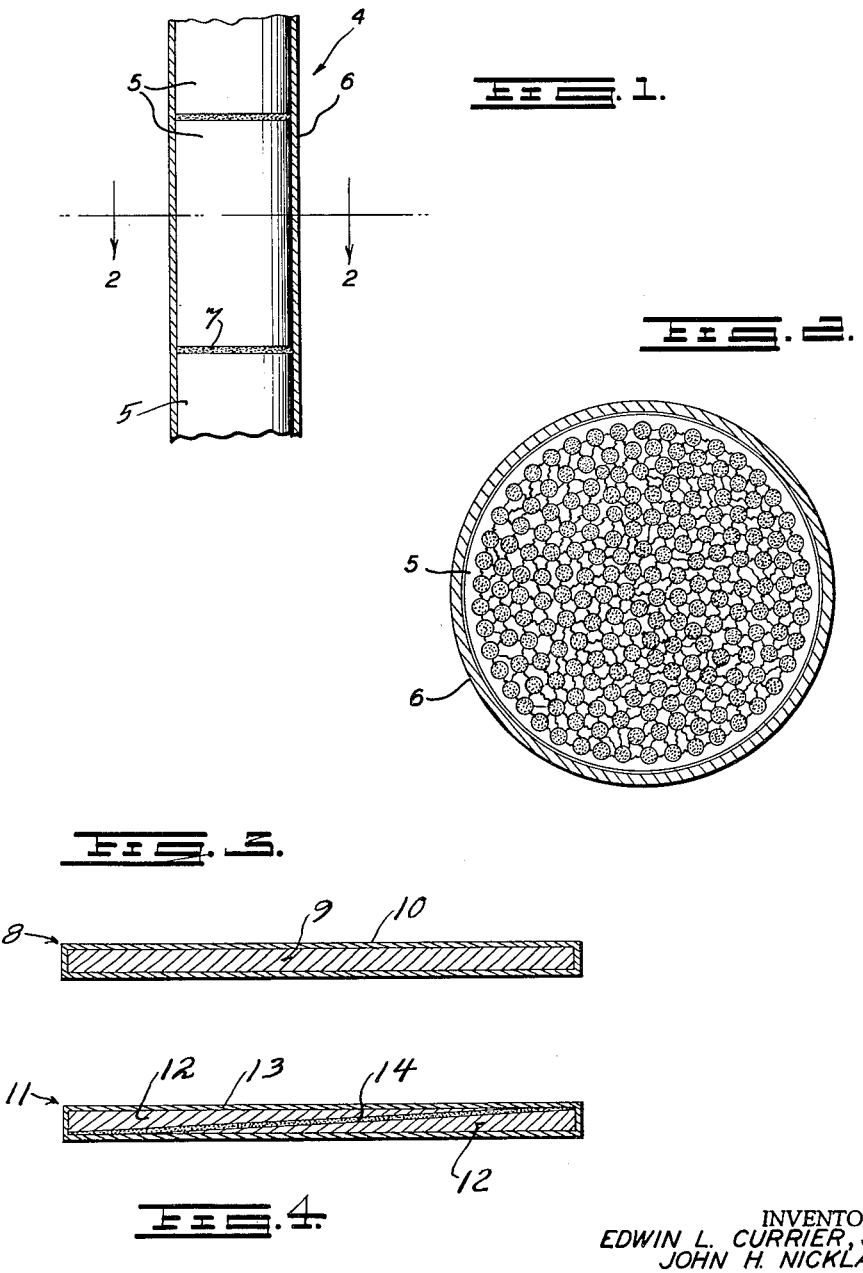

Edwin L. Currier, Jr., Silver Spring, and John H. Nicklas, Riverdale, Md., assignors, by mesne assignments, to the United States of America as represented by the United States Atomic Energy Commission
Filed Jan. 9, 1959, Ser. No. 785,862
2 Claims. (Cl. 204—193.2)

This invention relates to nuclear reactor fuel elements and, more particularly, to fuel-breeder type fuel elements.

For a better understanding of the invention, conventional nuclear terminology is used throughout the specification and claims. For example, "fissionable material" refers to neutron fissionable plutonium and uranium. "Fertile material" refers to thorium and uranium-238 which are capable of transmutation to fissionable species by neutron capture and beta decay.

As the supply of uranium is limited, the development of economically competitive nuclear power requires the conversion of relatively abundant thorium to uranium-233 and of uranium-238 to plutonium. The resulting uranium-233 and plutonium can then be used for the further conversion of fertile material. The potential thus exists for actually increasing the amount of fissionable material while, at the same time, extracting useful power. By thus breeding a by-product of great value, the unit cost of generating nuclear power is significantly reduced.

In "breeder type" reactors, the breeding is conducted along with the consumption of fissionable material and the manner and form in which the fertile material is employed is of great importance, as low fabrication and recovery costs are essential to economical operation of such reactors.

It is, therefore, an object of the invention to provide a fuel-breeder fuel element adapted to be fabricated at relatively low cost in either rod or plate form.

Another object of the invention resides in the provision of a fuel-breeder fuel element having improved heat transfer characteristics whereby higher flux levels can be safely reached.

A further object of the invention resides in the provision of a fuel-breeder fuel element which can be economically processed to reclaim the plutonium-239 bred in the uranium-238, the uranium-233 bred in the thorium, or the remaining uranium-235.

Another object of the invention resides in the provision of a plate or rod type fuel element comprising fissile oxide particles bonded together within a body of fertile metallic material.

Another object of the invention resides in the provision of a fuel-breeder fuel element in which new fissionable material created in the fuel element can be used to sustain a chain fission reaction.

The invention embodies other novel features and advantages which are hereinafter set forth in the specification and claims and illustrated in the accompanying drawing, forming a part thereof, wherein:

FIG. 1 is a fragmentary longitudinal section illustrating a rod type fuel element embodying features of the invention.

FIG. 2 is an enlarged transverse section taken along the line 2—2 of FIG. 1.

FIGS. 3 and 4 are transverse sections showing modified forms of the invention.

Referring now to the drawings for a better understanding of the invention and more particularly to FIGS. 1 and 2 therein, a rod type fuel element 4 is shown as comprising a plurality of cylindrical fuel pellets 5 enclosed within a tubular housing 6 formed of zirconium or stainless steel. If desired, powdered beryllium oxide 7 may be inserted between the pellets.

Each fuel pellet 5 comprises powdered $UO_2$ enriched with U–233 or U–235, preferably the latter, and mixed with either powdered uranium-238 metal or thorium metal, the composite mix being subjected to heat and pressure to form a solid, high density cylindrical pellet. It is also contemplated that the composite mix may be pressed to cylindrical form and then sintered at a temperature to fuse the metallic uranium or thorium. To reduce the volume of breeder metal, some of the breeder material could be added as an oxide, and sufficient quantities of metal would be includued to provide a continuous matrix of metal for conducting heat from the fissionable material to the tubular housing 6.

The powdered $UO_2$ may be, for example, of 170 mesh size and preferably enriched to about 90% in a fissionable isotope, such as uranium-235. The composite mix may comprise, for example, 50% by weight of $UO_2$ and 50% by weight of metal. Thorium metal may be preferable as the matrix as it is more resistant to radiation damage than uranium metal.

When the uranium-235 fissions, there is a release of about 200 mev. of energy, 162 mev. of which is produced as kinetic energy of recoil of the fission fragments of the fissioned uranium-235 atom. Therefore, about 70% of the heat produced in the pellet 5 must be removed from the oxide particle, and the continuous metal matrix serves as an efficient conductor for transferring the produced heat to the tubular housing.

Another advantage is that the fission fragments can be accommodated in the structure without causing the pellet to fragmentate which causes a loss in thermal conductivity in a pure ceramic pellet. A further advantage is that the plutonium-239 bred in the uranium metal, or the uranium-233 bred in the thorium metal, may be reclaimed in one process. A completely different process would be used to reclaim the unburned portion of the uranium-235 present in the oxide fuel. In the use of thorium as the matrix metal, the chemical reprocessing to reclaim the non-fissioned uranium-235 in the $UO_2$ and the uranium-233 produced as metal from the thorium would be simplified.

It will also be noted that the pellet 5 can be easily machined to close tolerances for a snug fit in the tubular housing 6. If desired, the tubular housing 6 could be swaged or otherwise worked into contact around the pellets for better heat transfer.

FIG. 3 illustrates a modified form of the invention in which a plate type fuel element 8 comprises a plurality of flat fuel pellets 9 arranged end to end within an elongated tubular housing 10 of generally rectangular section. The pellets comprise enriched $UO_2$ particles incorporated within a fertile metal matrix, as heretofore described. However, it is contemplated that the pellet may be formed entirely of $UO_2$, enriched with uranium-235, and sintered and machined to size for insertion into the housing. To provide greater structural strength, the fuel element 8 could be formed arcuate in section.

FIG. 4 illustrates another embodiment of the invention in which a plate type fuel element 11 comprises wedge-shape fuel pellets 12 enclosed within an elongated tubular housing 13 and urged against opposite side walls thereof by a filler layer 14 of beryllium oxide in powder form. The fuel pellet may comprise enriched $UO_2$ particles in a fertile metal matrix, or it may be formed entirely of enriched $UO_2$, compacted and sintered to provide a ceramic type pellet.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. A plate type fuel element for nuclear reactors, comprising a pair of elongated fuel plates of wedge-shape section consisting of a matrix of fertile breeder metal and fissionable uranium oxide particles dispersed throughout said matrix, a tubular housing enclosing said plates, and a layer of powdered beryllium oxide between said plates urging the latter against opposite sides of said housing.

2. The plate type fuel element claimed in claim 1 wherein said uranium oxide particles are enriched in an isotope selected from the group consisting of U-233 and U-235, said breeder metal is selected from the group consisting of U-238 and Th-232, and said housing is formed of zirconium.

References Cited in the file of this patent

UNITED STATES PATENTS

| | | |
|---|---|---|
| 2,696,661 | Kalischer | Dec. 14, 1954 |
| 2,848,391 | Fahnoe et al. | Aug. 19, 1958 |
| 2,852,460 | Abbott et al. | Sept. 16, 1958 |
| 2,969,313 | Grebe | Jan. 24, 1961 |
| 3,022,240 | Bassett | Feb. 20, 1962 |

OTHER REFERENCES

International Conf. on Peaceful Uses of Atomic Energy, 1955, vol. 9, pages 179–195.

International Conf. on Peaceful Uses of Atomic Energy, 1955, vol. 9, pages 203–207.

HW–52729, September 18, 1957, available from TIS, Industrial Reports Section, P.O. Box 1001, Oak Ridge, Tenn., or OTS, Dept. of Comm., Washington 25, D.C.